(12) United States Patent
Kang

(10) Patent No.: US 8,947,577 B2
(45) Date of Patent: Feb. 3, 2015

(54) LENS BARREL ASSEMBLY AND PHOTOGRAPHING APPARATUS HAVING THE SAME

(71) Applicant: Samsung Electronics Co., Ltd., Suwon-si, Gyeonggi-do (KR)

(72) Inventor: Yoon-seok Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 107 days.

(21) Appl. No.: 13/705,434

(22) Filed: Dec. 5, 2012

(65) Prior Publication Data

US 2013/0321697 A1 Dec. 5, 2013

(30) Foreign Application Priority Data

Jun. 5, 2012 (KR) .................. 10-2012-0060526

(51) Int. Cl.
| | | |
|---|---|---|
| *H04N 5/225* | (2006.01) | |
| *G02B 13/16* | (2006.01) | |
| *G02B 7/04* | (2006.01) | |
| *G02B 5/00* | (2006.01) | |
| *G03B 9/06* | (2006.01) | |
| *G02B 7/10* | (2006.01) | |

(52) U.S. Cl.
CPC .............. *G02B 7/04* (2013.01); *H04N 5/2254* (2013.01); *G02B 5/005* (2013.01); *G03B 9/06* (2013.01); *G02B 7/102* (2013.01)
USPC ........... 348/335; 348/340; 348/345; 348/348; 348/350; 348/352

(58) Field of Classification Search
USPC .................. 348/335, 340, 345, 348, 350, 352
See application file for complete search history.

(56) References Cited

U.S. PATENT DOCUMENTS

| | | | |
|---|---|---|---|
| 3,918,798 A | 11/1975 | Takano | |
| 5,410,432 A | 4/1995 | Kobayashi | |
| 5,790,316 A | 8/1998 | Terasawa et al. | |
| 6,246,832 B1 | 6/2001 | Terada | |
| 7,460,171 B2 | 12/2008 | Iida | |
| 8,040,616 B2 * | 10/2011 | Koyama et al. | 359/740 |
| 2009/0316020 A1 * | 12/2009 | Ezawa et al. | 348/226.1 |
| 2010/0328786 A1 | 12/2010 | Nomura | |
| 2011/0273781 A1 | 11/2011 | Nuno et al. | |
| 2011/0299844 A1 | 12/2011 | Hsieh et al. | |

FOREIGN PATENT DOCUMENTS

| | | |
|---|---|---|
| JP | 2006-165256 A | 6/2006 |
| JP | 2009-008853 A | 1/2009 |

OTHER PUBLICATIONS

PCT Search Report and Written Opinion established for PCT/KR2013/003271 (Aug. 24, 2013).
Search Report established for EP 12198240.9 (Sep. 18, 2013).
Extended Search Report established for EP 12198240.9 (Jan. 10, 2014).

* cited by examiner

*Primary Examiner* — Yogesh Aggarwal
(74) *Attorney, Agent, or Firm* — Drinker Biddle & Reath LLP

(57) ABSTRACT

A barrel assembly includes a barrel, at least one lens group disposed in the barrel to move in an optical axis direction, an aperture disposed in the barrel that adjusts an amount of light passing through the at least one lens group; and a light adjustment unit disposed in the barrel to move in the optical axis direction and that blocks light passing through a peripheral area of the at least one lens group when the at least one lens group is in at least one part of a travel section along which the at least one lens group moves in the barrel.

18 Claims, 13 Drawing Sheets

LENS BARREL ASSEMBLY AND PHOTOGRAPHING APPARATUS HAVING THE SAME

CROSS-REFERENCE TO RELATED PATENT APPLICATIONS

This application claims the priority benefit of Korean Patent Application No. 10-2012-0060526, filed on Jun. 5, 2012, in the Korean Intellectual Property Office, the disclosure of which is incorporated herein in its entirety by reference.

BACKGROUND

1. Field

Embodiments relate to a photographing apparatus, and more particularly, to a barrel assembly having improved relative illumination and a photographing apparatus having the barrel assembly.

2. Description of the Related Art

Lenses are essentially used for an optical system of a photographing apparatus such as a camera and perform a function of enlarging or reducing an image by passing light of an object. In general, a difference exists between the amount of light passing through a center portion of an optical axis of a lens and the amount of light passing through a peripheral portion of the lens. An optical system is provided with lenses that move along an optical axis direction in order to perform a zooming adjustment function, a focusing adjustment function, etc. As a lens moves, the amount of light at a peripheral portion of the lens is drastically reduced in a particular section of the lens's movement. To address such an issue, the size of an optical system is increased. However, increasing the size of an optical system is inappropriate for the design of a compact photographing apparatus.

U.S. Pat. No. 5,410,432 discloses a structure for controlling an aperture used to adjust the amount of light for photography. The aperture moves along an optical axis direction together with a second group lens and is operated by an operation lever provided at a main body of a camera to adjust the amount of light. Although the aperture may perform a function of adjusting the amount of light needed for photography, it may not address the issue of drastic reduction in the amount of light at the peripheral portion of a lens in a particular section where an interval between lenses changes. Thus, according to the patent, an optical system is designed to have a large size in order to prevent the drastic reduction in the amount of light at the peripheral portion of a lens.

SUMMARY

Embodiments include a barrel assembly having improved relative illumination, and a photographing apparatus having the barrel assembly.

Embodiments also include a photographing apparatus having a compact structure by reducing the length of an accommodation space for accommodating lenses of a barrel assembly having a zoom lens.

Furthermore, embodiments prevent the drastic reduction of relative illumination by blocking part of light in a part of operation sections of a zoom lens.

According to an embodiment, a barrel assembly includes a barrel, at least one lens group disposed in the barrel to move in an optical axis direction, an aperture disposed in the barrel that adjusts an amount of light passing through the at least one lens group; and a light adjustment unit disposed in the barrel to move in the optical axis direction and that blocks light passing through a peripheral area of the at least one lens group when the at least one lens group is in at least one part of a travel section along which the at least one lens group moves in the barrel.

The light adjustment unit may include a movable unit having a through hole for passing light and disposed in the barrel to move in the optical axis direction, and a wing unit movably coupled to the movable unit to adjust an opening area of the through hole by protruding toward the through hole when the movable unit is located in the at least one part of the travel section in the barrel.

The wing unit may be rotatably coupled to the movable unit to rotate between a closing position where the wing unit protrudes toward the through hole and an opening position where the wing unit retreats outside the through hole.

The light adjustment unit may further include a first cylindrical housing having a hollow shape and having a first cam groove that curvilinearly extends along a wall surface of the first cylindrical housing and a linear groove that linearly extends, a driving plate having a first protruding portion that outwardly protrudes and is inserted in the first cam groove, coupled to the movable unit to rotate with respect to the movable unit, and connected to the wing unit to rotate the wing unit with respect to the movable unit, and a second cylindrical housing disposed outside the first cylindrical housing to rotate with respect to the first cylindrical housing and having a second cam groove that curvilinearly extends, wherein the movable unit further comprises a second protruding unit outwardly protruding to be coupled to the second cam groove by passing through the linear groove, and the movable unit is disposed in the first cylindrical housing to move in a direction in which the first cylindrical housing extends.

The first cam groove may include a linear portion extending in a direction in which the first cylindrical housing extends, and a curved portion curved along a circumferential direction of the first cylindrical housing.

The wing unit may include a slot, and the driving plate may further include a guide protrusion that is inserted in the slot of the wing unit.

The movable unit may further include an insertion slot extending in a circumferential direction of the movable unit, and the guide protrusion may be inserted in the insertion slot after passing through the slot of the wing unit.

The driving plate may further include an edge step portion extending a predetermined distance along an outer circumference of the driving plate, and the movable unit may further include a support protrusion that is coupled to the edge step portion to support the driving plate.

The barrel assembly may further include a first driving unit that operates by an externally applied signal and that moves the first movable unit in the barrel in the optical axis direction; and a second driving unit that operates by an externally applied signal and that moves the wing unit toward the through hole.

The at least one lens group may include a plurality of lenses whose intervals in the optical axis direction are adjusted, and when the intervals between the lenses are adjusted to be at a wide position, the light adjustment unit may block the light corresponding to the peripheral area of the at least one lens group.

According to another embodiment, a photographing apparatus includes a barrel, at least one lens group disposed in the barrel to move in an optical axis direction, an aperture disposed in the barrel that adjusts an amount of light passing through the at least one lens group, a light adjustment unit disposed in the barrel to move in the optical axis direction and that blocks light passing through a peripheral area of the at least one lens group when the at least one lens group is in at least one part of a travel section along which the at least one lens group moves in the barrel, an imaging device that converts the light passing through the light adjustment unit to an electric signal, and a brightness correction unit that corrects brightness of an image acquired by an electric signal of the photographing device.

The light adjustment unit may include a movable unit having a through hole for passing light and arranged in the barrel to move in the optical axis direction, and a wing unit movably coupled to the movable unit to adjust an opening area of the through hole by protruding toward the through hole when the movable unit is located in the at least part of a section in the barrel.

The wing unit may be rotatably coupled to the movable unit to rotate between a closing position where the wing unit protrudes toward the through hole and an opening position where the wing unit retreats outside the through hole.

The light adjustment unit may further include a first cylindrical housing having a hollow shape and having a first cam groove that curvilinearly extends along a wall surface of the first cylindrical housing and a linear groove that linearly extends, a driving plate having a first protruding portion that outwardly protrudes and is inserted in the first cam groove, coupled to the movable unit to rotate with respect to the movable unit, and connected to the wing unit to rotate the wing unit with respect to the movable unit, and a second cylindrical housing disposed outside the first cylindrical housing to rotate with respect to the first cylindrical housing and having a second cam groove that curvilinearly extends, wherein the movable unit may further include a second protruding unit outwardly protruding to be coupled to the second cam groove by passing through the linear groove, and the movable unit may be disposed in the first cylindrical housing to move in a direction in which the first cylindrical housing extends.

The wing unit may include a slot, and the driving plate may further include a guide protrusion that is inserted in the slot of the wing unit.

The movable unit may further include an insertion slot extending in a circumferential direction of the movable unit, and the guide protrusion may be inserted in the insertion slot after passing through the slot of the wing unit.

The driving plate may further include an edge step portion extending a predetermined distance along an outer circumference of the driving plate, and the movable unit may further include a support protrusion that is coupled to the edge step portion to support the driving plate.

The photographing apparatus may further includes a first driving unit that operates by an externally applied signal and that moves the first movable unit in the barrel in the optical axis direction, and a second driving unit that operates by an externally applied signal and that moves the wing unit toward the through hole.

The brightness correction unit may correct brightness only for the peripheral area of an image acquired by the imaging device.

The photographing apparatus may further include a storage unit that stores positions of pixels of an image with light amounts that are reduced corresponding to the peripheral area of the at least one lens group when the light adjustment unit blocks light passing through the peripheral area of the at least one lens group, and the brightness correction unit may correct brightness of the positions of pixels stored by the storage unit.

BRIEF DESCRIPTION OF THE DRAWINGS

The above and other features and advantages will become more apparent by describing in detail exemplary embodiments with reference to the attached drawings in which.

DETAILED DESCRIPTION

Figure 1:
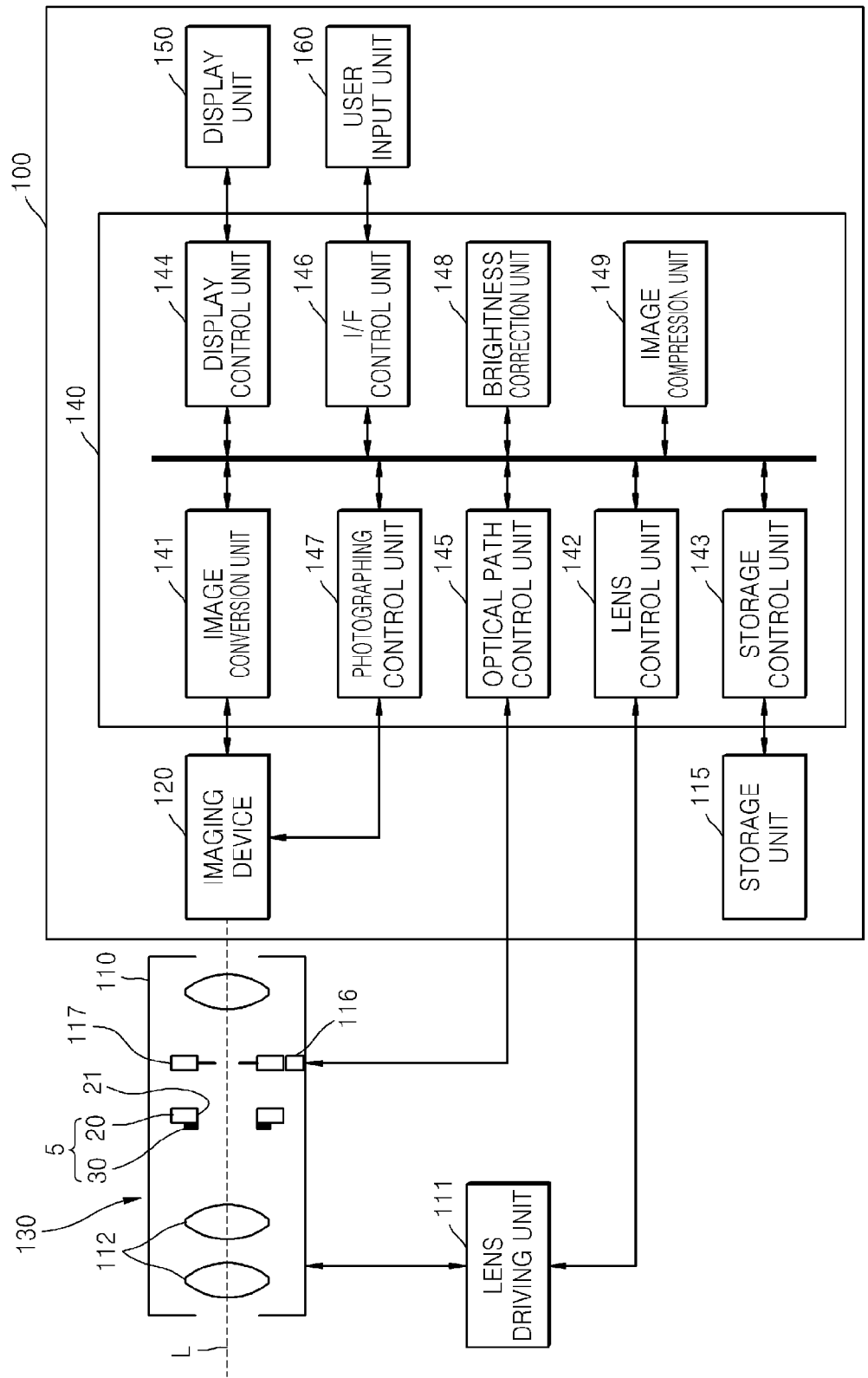
FIG. 1 is a block diagram schematically illustrating a relationship between constituent elements of a photographing apparatus having a barrel assembly, according to an embodiment.

The enclosed drawings for illustrating exemplary embodiments are referred to in order to gain a sufficient understanding of the principles and merits thereof, and the objectives accomplished by their implementation. Hereinafter, exemplary embodiments will be described in detail with reference to the attached drawings. Like reference numerals in the drawings denote like elements.

As used herein, the term "and/or" includes any and all combinations of one or more of the associated listed items FIG. 1 is a block diagram schematically illustrating a relationship between constituent elements of a photographing apparatus having a barrel assembly 130, according to an embodiment. Referring to FIG. 1, the photographing apparatus includes the barrel assembly 130, an imaging device 120 for converting light passing through the barrel assembly 130 to an electric signal, and a brightness correction unit 148 for correcting brightness of an image acquired by the imaging device 120.

The barrel assembly 130 performs a function of forming an image of an object on the imaging device 120. For example, the barrel assembly 130 may be detachably installed on a main body 100 of the photographing apparatus, or fixed to the main body 100.

The barrel assembly 130 further includes a barrel 110, a plurality of lens groups 112 arranged in the barrel 110 to move in an optical axis direction L, an aperture 117 that adjusts the amount of light passing through the lens groups 112, and a light adjustment unit 5 arranged in the barrel 110 to move in the optical axis direction L and blocking light passing through a peripheral area of each of the lens groups 112 in at least one part of a travel section along which the plurality of lens groups 112 moves in the barrel 110. The travel section refers to a distance that the plurality of lens groups 112 moves in the barrel 110.

The imaging device 120 performs a function of acquiring an image of an object by converting light transmitted from the barrel assembly 130 to an electric signal. The photographing apparatus according to the present embodiment may be embodied in a variety of forms such as a digital still camera for photographing a still image or a digital video camera for recording moving pictures.

The imaging device 120 captures an image of an object and converts the image to an electric signal. The electric signal generated by the imaging device 120 is converted to image data by an image conversion unit 141. A photographing control unit 147 of a control unit 140 performs a photographing operation by controlling the imaging device 120.

The barrel assembly 130, including the lens groups 112, the aperture 117, and the light adjustment unit 5, forms an optical system that is arranged in front of the imaging device 120. The lens groups 112 and the aperture 117 perform a function of forming an image by introducing an external image light onto an imaging surface of the imaging device 120.

The lens groups 112 are arranged such that an interval between the lens groups 112 can be changed. When the interval between the lens groups 112 is changed, a zoom ratio or a focal point may be adjusted. The lens groups 112 are arranged along the optical axis L, which is an imaginary line connecting the optical centers of the lens groups 112.

The lens groups 112 are driven by a lens driving unit 111 having a drive unit such as a zoom motor (not shown) so that the relative positions of the lens groups 112 may be changed. The lens groups 112 may include a zoom lens for magnifying or reducing the size of an object and a focus lens for adjusting a focal point of the object.

The lens driving unit 111 is operated by a control signal applied by a lens control unit 142 of the control unit 140 and controls the positions of the lens groups 112 so that the lens groups 112 may have at least one of a plurality of magnification ratios.

The imaging device 120 includes a photoelectric conversion device such as a charge-coupled device (CCD) or a complementary metal oxide semiconductor (CMOS) and converts image light input that has passed through the lens groups 112 and the aperture 117 to an electric signal. The imaging device 120 is operated by a control signal applied by the photographing control unit 147.

The image conversion unit 141 converts the electric signal of the imaging device 120 to image data to be image-processed or stored in a storage medium such as a storage unit 115. For example, the image conversion unit 141 may convert the electric signal of the imaging device 120 to RGB data and then the RGB data to a raw data in the form of YUV signals including a brightness (Y) signal and a chromatic (UV) signal.

The conversion of an electric signal of the imaging device 120 by the image conversion unit 141 may include reducing operation noise of the imaging device 120 included in the electric signal by using, for example, a correlated double sampling (CDS) circuit, adjusting a gain of a signal after the noise reduction by using an automatic gain control (AGC) circuit, converting an analog signal to a digital signal by using an analog-to-digital (A/D) converter, and other signal processing operations such as pixel defect correction, gain correction, white balance correction, gamma correction, etc. with respect to the digital signal. The CDS circuit, the AGC circuit, the A/D converter, etc. may be provided as separate circuits.

The control unit 140 is electrically connected to the imaging device 120, the lens driving unit 111, the storage unit 115, and a user input unit 160 and exchanges control signals with such constituent elements to control their operations or performs a function of processing data.

The control unit 140 includes the image conversion unit 141, the lens control unit 142, a storage control unit 143, a display control unit 144, an optical path control unit 145, an input/output interface control unit (I/F) control unit 146, the photographing control unit 147, the brightness correction unit 148, and an image compression unit 149.

The control unit 140 may be embodied as a microchip or a circuit board having a microchip. The constituent elements included in the control unit 140 may be embodied as software or electronic circuits built in the control unit 140.

The storage control unit 143 controls data recording on the storage unit 115 and reading/writing of recorded data or setting information.

The storage unit 115 may be an internal volatile memory and formed of a semiconductor memory device, for example, a synchronous dynamic random access memory (SDRAM). The storage unit 115 may perform a buffer memory function for temporarily storing image data generated by the image conversion unit 141 and a work memory function used for a data processing work.

The storage unit 115 may also be an external non-volatile memory, for example, a flash memory such as a memory stick or a secure digital multimedia card (SD/MMC), a storage device such as a hard disk drive (HDD), or an optical storage device such as a digital versatile disc (DVD) or a compact disc (CD). In this case, image data that is compression-converted by the image compression unit 149 in the form of a JPEG file, a TIF file, a GIF file, or a PCX file may be stored in the storage unit 115.

The photographing apparatus may include a display unit 150 for displaying an image of image data. For example, the photographing apparatus may be embodied as a touch screen that generates a signal corresponding to a touch location on a surface thereof of a display device such as a liquid crystal display (LCD) or an organic light-emitting diode (OLED) display.

The brightness correction unit 148 performs a function of correcting brightness of an entire area or a partial area of an image acquired by the imaging device 120.

The aperture 117 and an aperture driving unit 116 for adjusting the amount of light are provided on an optical path of the barrel 110. The aperture driving unit 116 is operated by a control signal applied by the optical path control unit 145 to drive the aperture 117.

The user input unit 160 receives a user input through a menu button or a control dial and generates a signal. The signal generated by the user input unit 160 is input to the control unit 140 via the I/F control unit 146.

The light adjustment unit 5 of the barrel assembly 130 includes a first through hole 21 for passing light and may move in the barrel 110 in the optical axis direction L. While the lens groups 112 moves in the optical axis direction L to perform a zoom adjustment function or a focus adjustment function, the light adjustment unit 5 may move a different distance at a different speed from those of the lens groups 112.

The light adjustment unit 5 includes a wing unit 30 that protrudes from a movable unit 20 toward the first through hole 21 to adjust an opening area of the first through hole 21. During the adjustment of the positions of the lens groups 112 for zoom adjustment or focus adjustment, the relative illumination of the barrel assembly 130 may be drastically reduced in a certain part of the travel section. The certain part of the travel section with a drastic reduction of the relative illumination is an illumination reduction part. The wing unit 30 blocks light corresponding to the peripheral area of the lens groups 112 by reducing the opening area of the first through hole 21 in the illumination reduction part of the travel section where the relative illumination of the barrel assembly 130 is drastically reduced. Accordingly, the drastic reduction of the relative illumination may be reduced.

The relative illumination corresponds to a ratio of a light amount at the peripheral portion of a lens to a light amount at the center of an optical axis of the lens.

Figure 2:
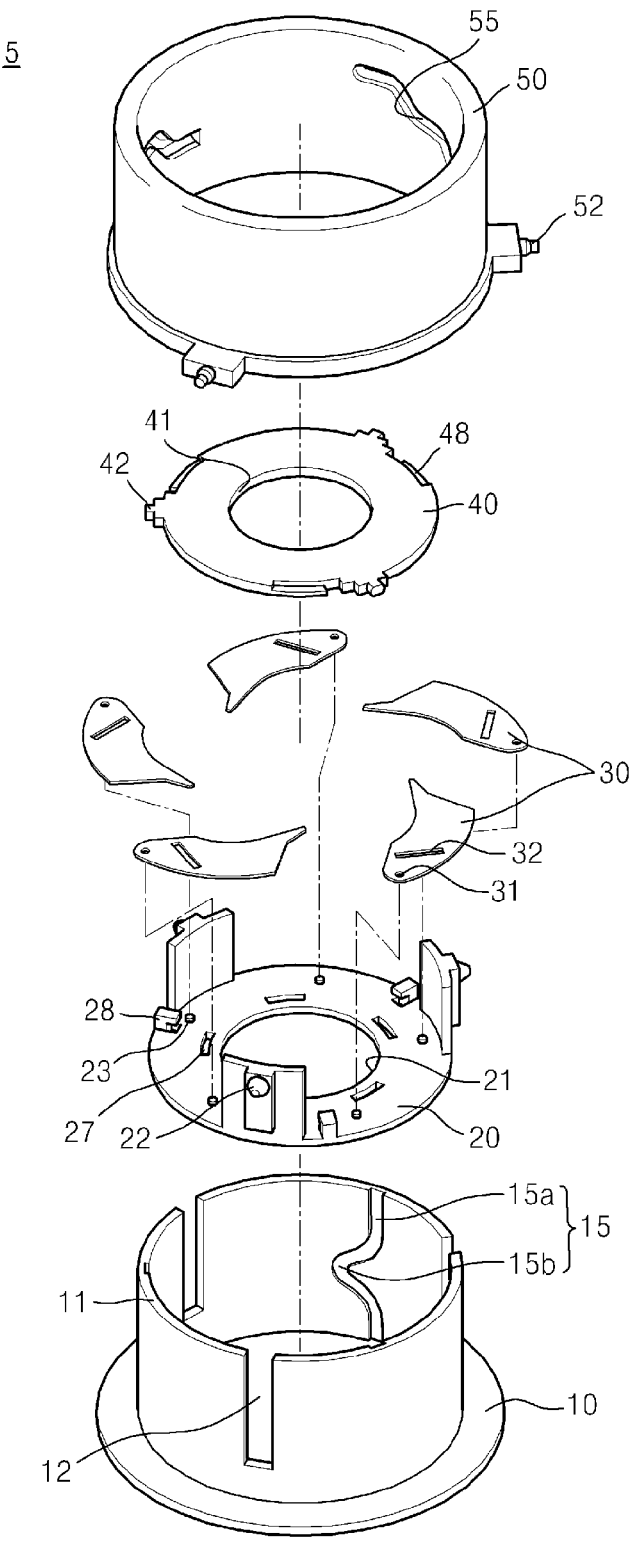
FIG. 2 is an exploded perspective view schematically illustrating constituent elements of a light adjustment unit of the barrel assembly of FIG. 1, according to an embodiment.
Figure 3:
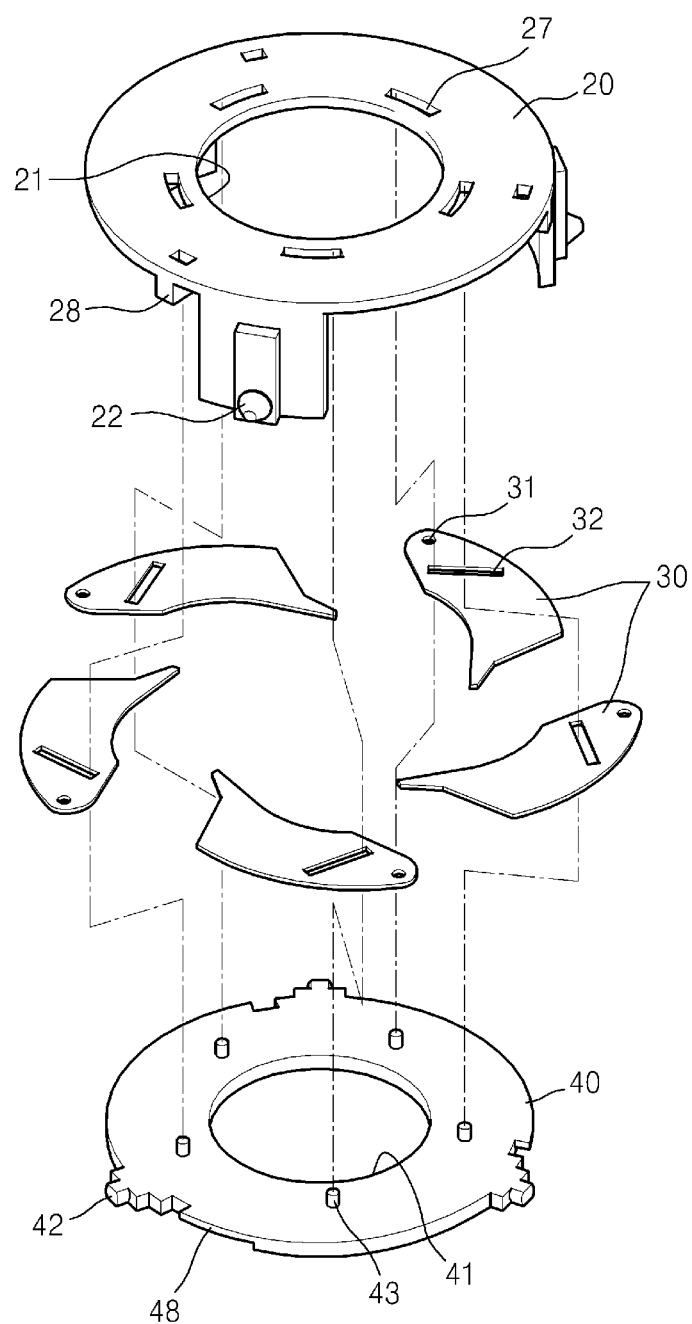
FIG. 3 is an exploded perspective view schematically illustrating a relationship between some constituent elements of the light adjustment unit of FIG. 2, according to an embodiment.
Figure 4:
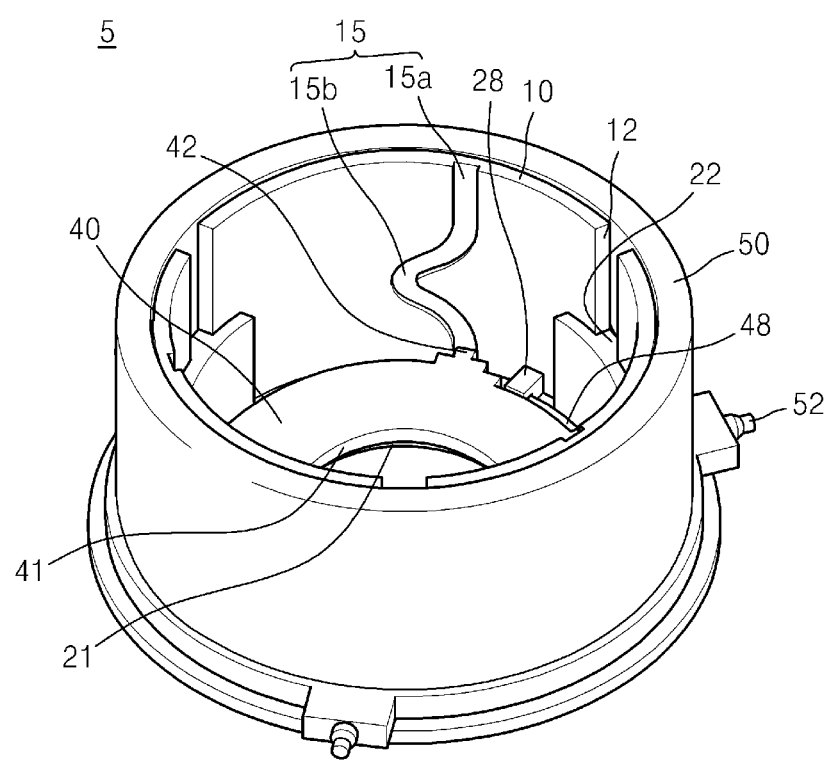
FIG. 4 is a perspective view schematically illustrating the assembled light adjustment unit of FIG. 2, according to an embodiment.

FIG. 2 is an exploded perspective view schematically illustrating constituent elements of the light adjustment unit 5 of the barrel assembly 130 of FIG. 1, according to an embodiment. FIG. 3 is an exploded perspective view schematically illustrating a relationship between some constituent elements of the light adjustment unit 5 of FIG. 2, according to an embodiment. FIG. 4 is a perspective view schematically illustrating the assembled light adjustment unit 5 of FIG. 2, according to an embodiment.

Referring to FIG. 2, the light adjustment unit 5 includes the movable unit 20 having a disc shape for passing light, including the first through hole 21, and arranged in the barrel 110 of FIG. 1 to move in the optical axis direction L, and the wing unit 30 coupled to the movable unit 20 to move to adjust the opening area of the first through hole 21. The wing unit 30 may adjust the opening area of the first through hole 21 by protruding toward the first through hole 21 when the movable unit 20 is located in the barrel 110 in the illumination reduction part of the travel section.

The wing unit 30 is coupled to the movable unit 20 to rotate between a closing position to protrude toward the first through hole 21 and an opening position to retreat outside the first through hole 21. As a coupling hole 31 of the wing unit 30 is rotatably coupled to a rotational protrusion 23 of the movable unit 20, the wing unit 30 may rotate around the rotational protrusion 23. Although five wing units 30 are provided in the present embodiment, the number of wing units 30, the shape thereof, and a coupling structure of the movable unit 20 may be modified variously.

The light adjustment unit 5 includes a first cylindrical housing 10 having a hollow shape, a driving plate 40 coupled to the movable unit 20 arranged in the first cylindrical housing 10 to move in the optical axis direction L, and a second cylindrical housing 50 arranged outside the first cylindrical housing 10 and rotating with respect to the first cylindrical housing 10.

The first cylindrical housing 10 includes a first cam groove 15 curvilinearly extending along a wall surface 11 and a linear groove 12 linearly extending along the wall surface 11.

The second cylindrical housing 50 is arranged outside the first cylindrical housing 10 to rotate with respect to the first cylindrical housing 10. The second cylindrical housing 50 includes a second cam groove 55 that curvilinearly extends. The second cylindrical housing 50 includes a third protruding portion 52 protruding outwardly. While the first cylindrical housing 10 stays fixed to the second cylindrical housing 50, an external rotational force is transferred to the third protruding portion 52 of the second cylindrical housing 50 and thus the second cylindrical housing 50 may be rotated with respect to the first cylindrical housing 10.

The driving plate 40 is coupled to the movable unit 20 that is arranged in the first cylindrical housing 10, to rotate with respect to the movable unit 20. The driving plate 40 includes a first protruding portion 42 that is provided at an outer circumferential surface of the driving plate 40 and inserted in the first cam groove 15 of the first cylindrical housing 10. The driving plate 40 includes a second through hole 41 corresponding to the first through hole 21 of the movable unit 20.

The movable unit 20 includes a second protruding portion 22 protruding outwardly and coupled to the second cam groove 55 of the second cylindrical housing 50 after passing through the linear groove 12 of the first cylindrical housing 10. Thus, a rotational force of the second cylindrical housing 50 arranged outside the first cylindrical housing 10 is transferred to the second protruding portion 22 of the movable unit 20 via the second cam groove 55. Since the direction of a movement of the movable unit 20 is restricted by the linear groove 12 of the first cylindrical housing 10, the movable unit 20 performs a linear motion along the linear groove 12 of the first cylindrical housing 10 as the second cylindrical housing 50 rotates.

The driving plate 40 is rotatably coupled to the movable unit 20 and may move in the first cylindrical housing 10 with the movable unit 20. Since the first protruding portion 42 of the driving plate 40 is coupled to the first cam groove 15 of the first cylindrical housing 10, while the movable unit 20 moves in the first cylindrical housing 10, the first protruding portion 42 is guided by the first cam groove 15 and thus the driving plate 40 may be rotated with respect to the movable unit 20.

The first cam groove 15 includes a linear portion 15a extending in a direction in which the first cylindrical housing 10 extends and a curved portion 15b connected to the linear portion 15a and extended to be curved along a circumferential direction of the first cylindrical housing 10 and to be inclined with respect to the direction of the first cylindrical housing 10. The curved portion 15b allows the driving plate 40 to rotate with respect to the movable unit 20 and thus the wing unit 30 may protrude toward the first through hole 21.

Since the driving plate 40 is connected to the wing unit 30 and rotates with respect to the movable unit 20, the wing unit 30 may be rotated with respect to the movable unit 20. The wing unit 30 includes a slot 32. The driving plate 40 includes a guide protrusion 43 protruding toward the movable unit 20. The guide protrusion 43 is coupled to an insertion slot 27 extending in a circumferential direction of the movable unit 20, after passing through the slot 32 of the wing unit 30.

While the driving plate 40 rotates with respect to the movable unit 20, the guide protrusion 43 moves in the circumferential direction along the insertion slot 27 of the movable unit 20. As the rotational force of the driving plate 40 is transferred to the slot 32 of the wing unit 30 via the guide protrusion 43, the wing unit 30 may be rotated with respect to the movable unit 20.

The driving plate 40 includes an edge step portion 48 extending a predetermined distance in the circumferential direction of the driving plate 40. The movable unit 20 includes a support protrusion 28 coupled to the edge step portion 48 to support the driving plate 40. While the driving plate 40 is rotated with respect to the movable unit 20, the support protrusion 28 performs a function of supporting the driving plate 40 to not separate from the movable unit 20.

Figure 5:
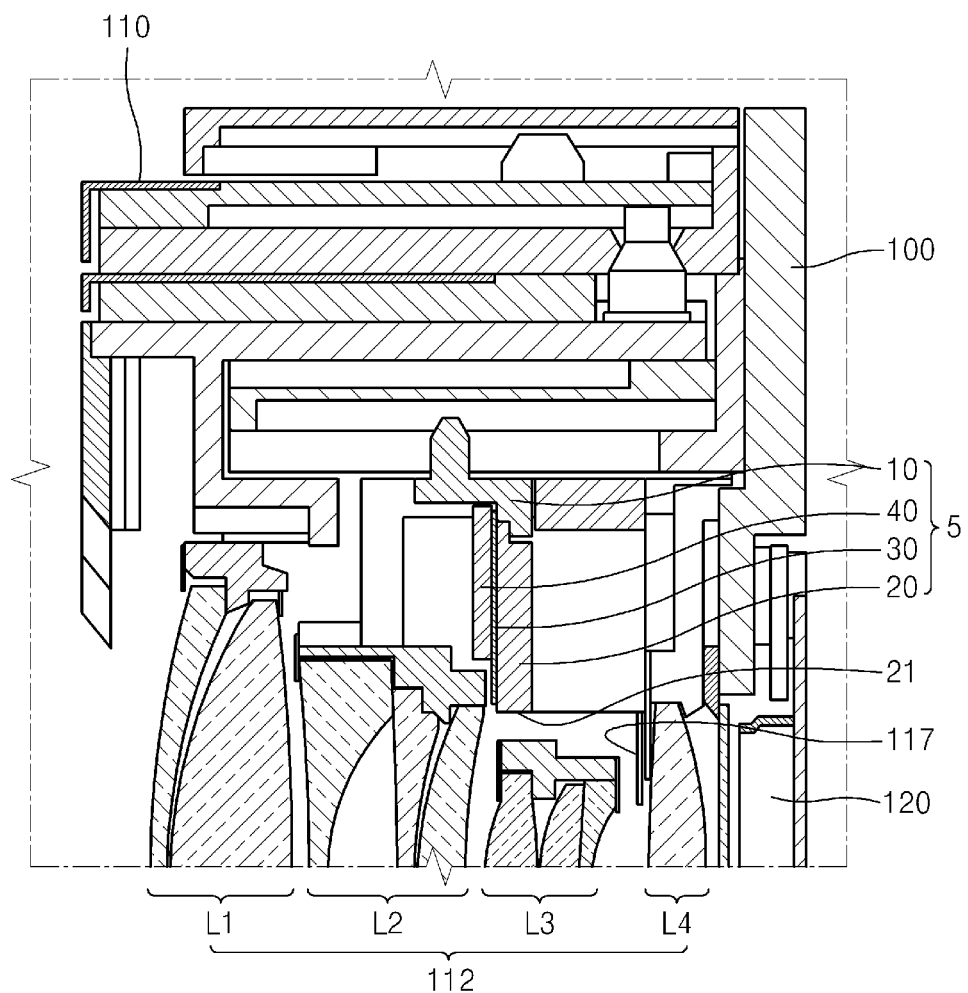
FIG. 5 is a cross-sectional view schematically illustrating the photographing apparatus of FIG. 1, according to an embodiment.
Figure 6:
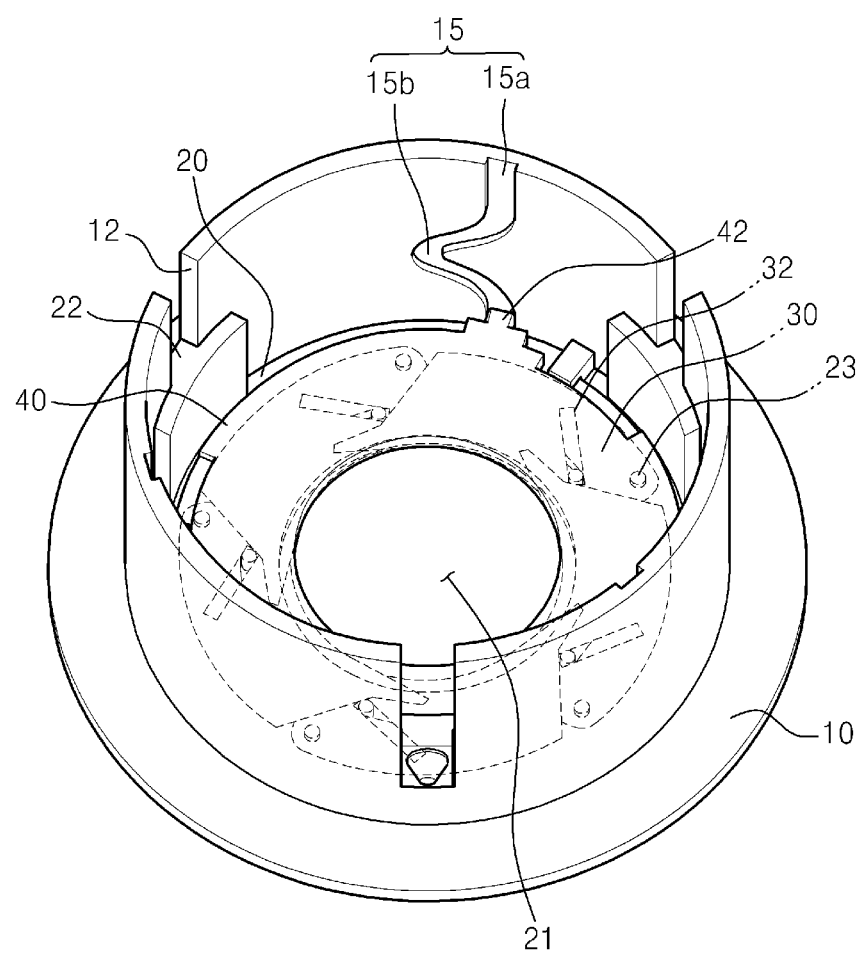
FIG. 6 is a perspective view schematically illustrating an operation state of some constituent elements of the light adjustment unit of FIG. 3, according to an embodiment.

FIG. 5 is a cross-sectional view schematically illustrating the photographing apparatus of FIG. 1, according to an embodiment. FIG. 6 is a perspective view schematically illustrating an operation state of some constituent elements of the light adjustment unit 5 of FIG. 3, according to an embodiment.

Referring to FIG. 5, the barrel 110 is arranged in front of the main body 100 of the photographing apparatus and the imaging device 120 is arranged in the main body 100 at a position where light arrives after passing through the lens groups 112. Also, the aperture 117 for adjusting a light amount and a depth of field for photography is arranged near the third lens L3.

FIGS. 5 and 6 illustrate a state in which the first through hole 21 is completely opened by the light adjustment unit 5. This state of the photographing apparatus corresponds to a state in which the barrel 110 is collapsed and accommodated in the main body 100.

When the barrel 110 is in an accommodation state, a first lens group L1, a second lens group L2, a third lens group L3, and a fourth lens group L4 of the lens groups 112 are moved to closely contact each other. Since the wing unit 30 of the light adjustment unit 5 is moved outside the first through hole 21, a space for the accommodation operation of the lens groups 112 may be sufficiently obtained.

Figure 7:
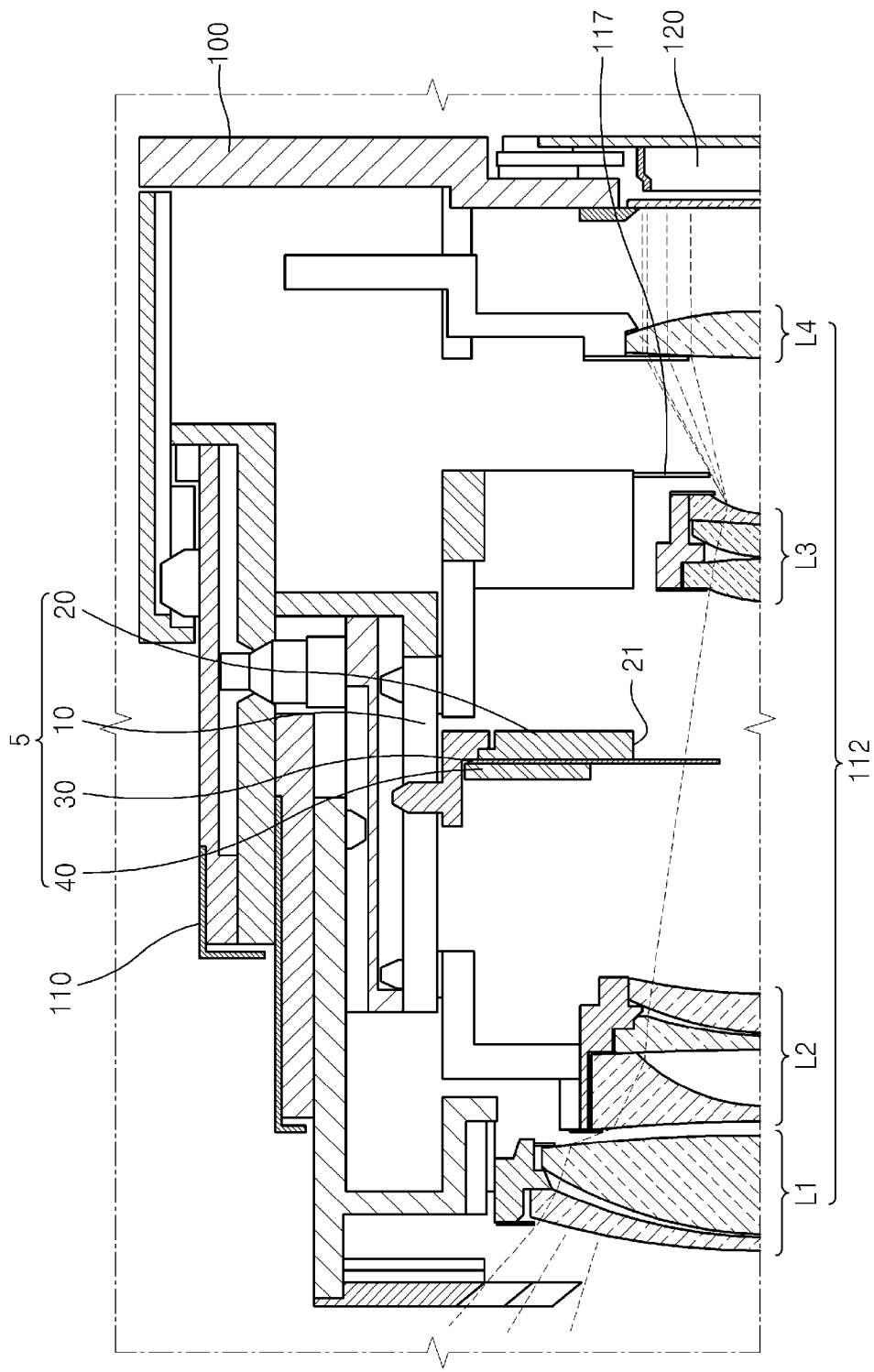
FIG. 7 is a cross-sectional view schematically illustrating an operation state of the photographing apparatus of FIG. 1, according to an embodiment.
Figure 8:
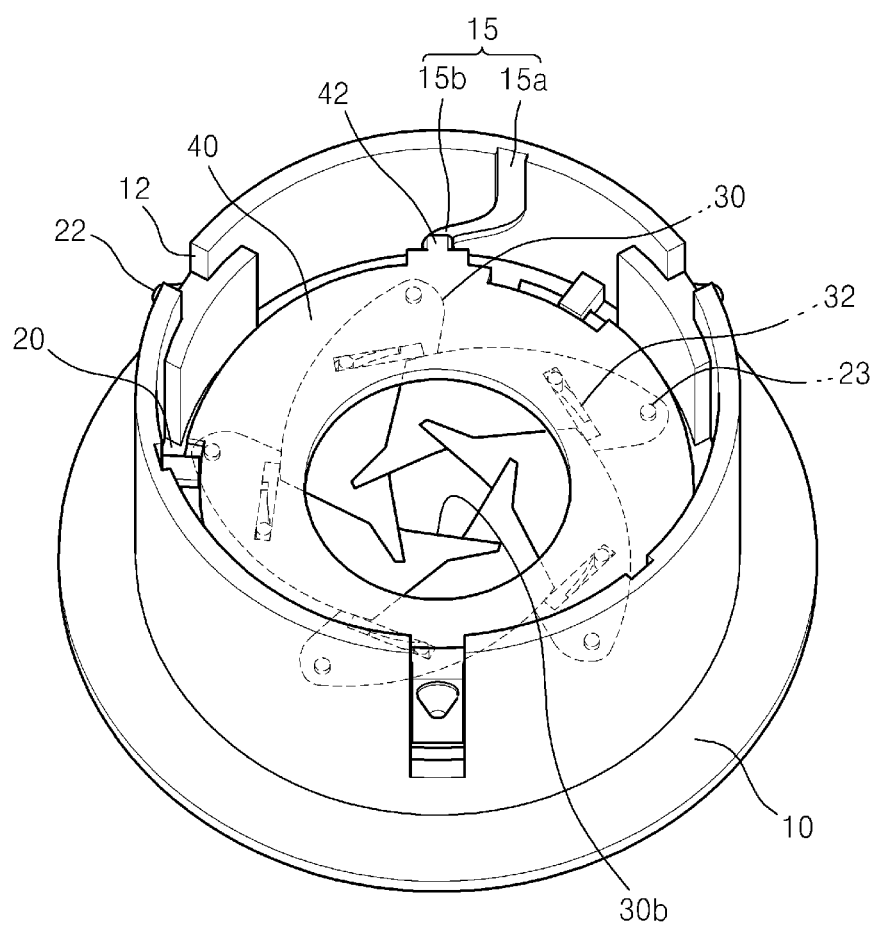
FIG. 8 is a perspective view schematically illustrating another operation state of some constituent elements of the light adjustment unit of FIG. 3, according to an embodiment.

FIG. 7 is a cross-sectional view schematically illustrating an operation state of the photographing apparatus of FIG. 1, according to an embodiment. FIG. 8 is a perspective view schematically illustrating another operation state of some constituent elements of the light adjustment unit 5 of FIG. 3, according to an embodiment.

The photographing apparatus of FIGS. 7 and 8 is in a wide position in which the respective intervals between the first lens group L1, the second lens group L2, the third lens group L3, and the fourth lens group L4 of the lens groups 112 of the barrel 110 are adjusted.

The movable unit 20 and the driving plate 40 of the light adjustment unit 5 move together along the first cylindrical housing 10. While the movable unit 20 moves, the first protruding portion 42 of the driving plate 40 moves to the curved portion 15b of the first cam groove 15 and thus the driving plate 40 is rotated with respect to the movable unit 20. As the wing unit 30 is rotated with respect to the movable unit 20 due to the rotation of the driving plate 40, the wing unit 30 protrudes toward the first through hole 21.

In the wide position of FIGS. 7 and 8, since the wing unit 30 of the light adjustment unit 5 protrudes toward the first through hole 21 to form a light through hole 30b having a size smaller than that of the first through hole 21, the light corresponding to the peripheral area of the lens groups 112 is blocked and thus relative illumination may be adjusted.

A position where the wing unit 30 protrudes toward the first through hole 21 while the movable unit 20 moves in the first cylindrical housing 10 is determined by the position of the curved portion 15b of the first cam groove 15. Also, the size of the light through hole 30b formed by the wing unit 30 may be changed by adjusting an angle at which the wing unit 30 is rotated with respect to the movable unit 20 by changing a form of curvature of the curved portion 15b.

The position where the wing unit 30 protrudes toward the first through hole 21 is not limited to the above-described structure and the lengths of the curved portion 15b and the linear portion 15a, the position of the curved portion 15b, a degree of curvature of the curved portion 15b, or the number of curved portions may be changed.

Figure 9:
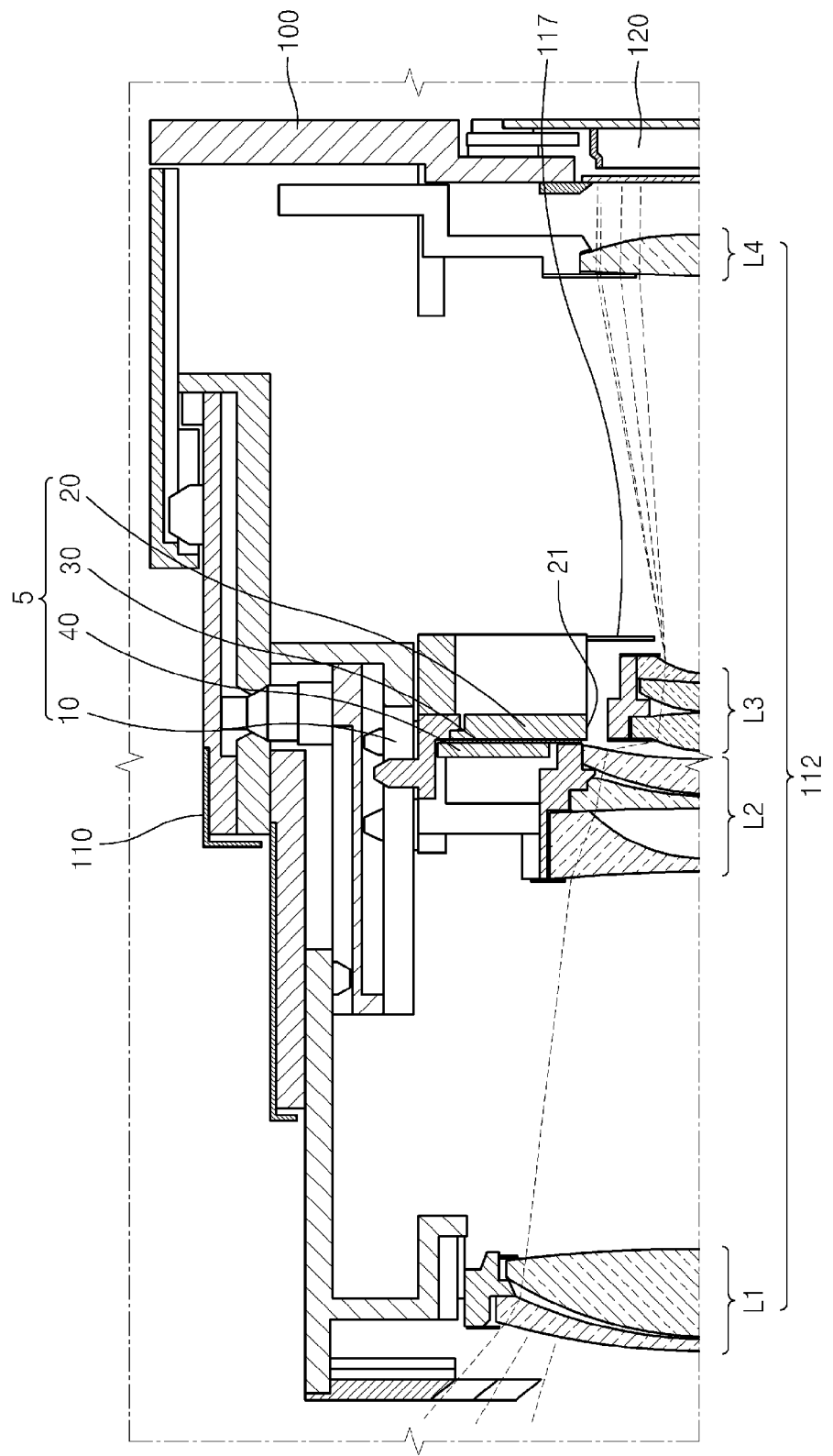
FIG. 9 is a cross-sectional view schematically illustrating another operation state of the photographing apparatus of FIG. 1, according to an embodiment.

FIG. 9 is a cross-sectional view schematically illustrating another operation state of the photographing apparatus of FIG. 1, according to an embodiment. In the photographing apparatus of FIG. 9, the lens groups 112 of the barrel 110 are adjusted suitably for a telephoto position. Since there is no need to adjust relative illumination in the telephoto position, the wing unit 30 of the light adjustment unit 5 retreats outside the first through hole 21 and thus the first through hole 21 is completely open.

Figure 10:
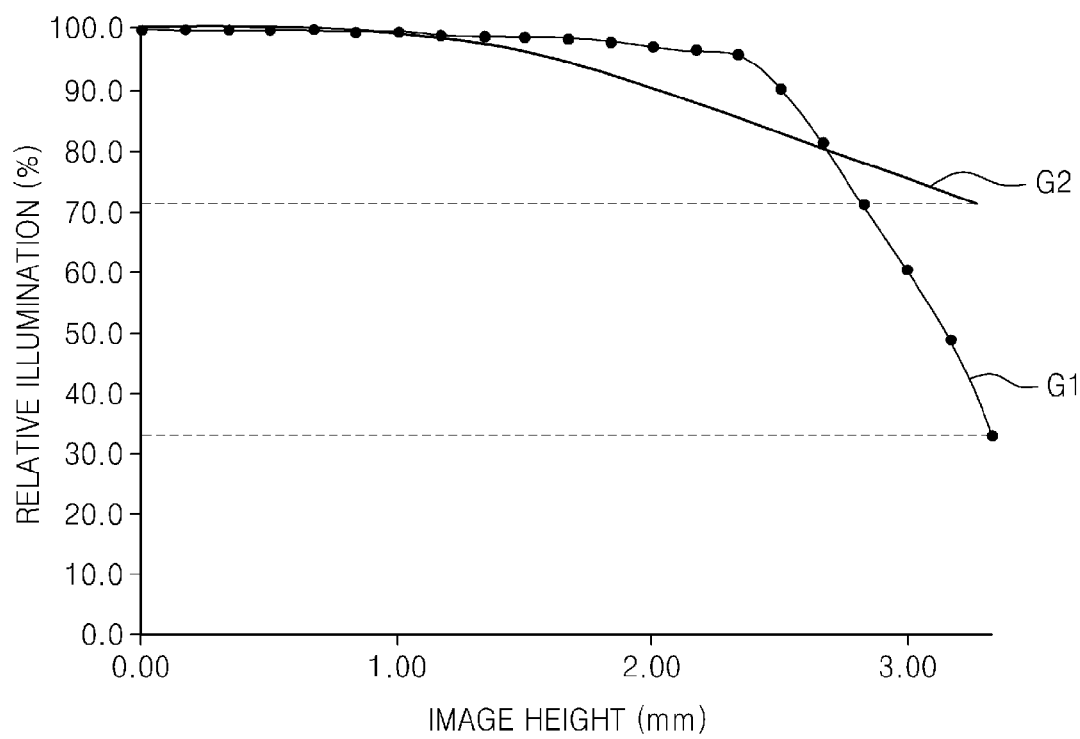
FIG. 10 is a graph of relative illumination showing that relative illumination is adjusted in the photographing apparatus of FIG. 7, according to an embodiment.
Figure 11:
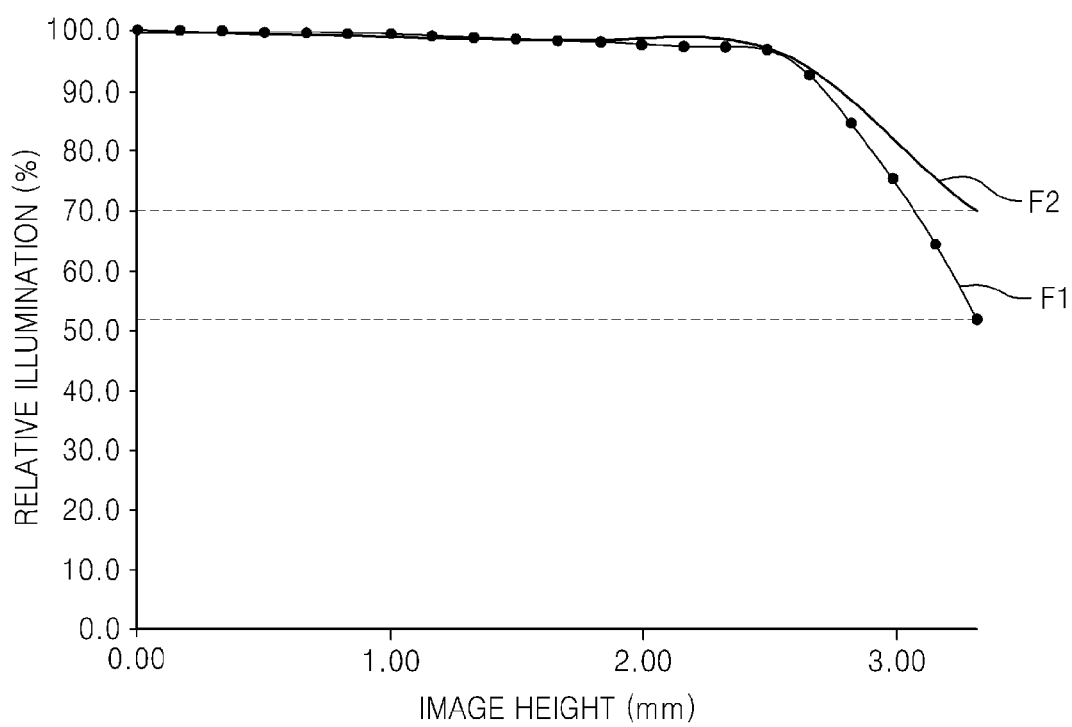
FIG. 11 is a graph of relative illumination in a photographing apparatus of a comparative example for comparison with the photographing apparatus of FIG. 7, according to an embodiment.

FIG. 10 is a graph of relative illumination showing that relative illumination is adjusted in the photographing apparatus of FIG. 7, according to an embodiment. FIG. 11 is a graph of relative illumination in a photographing apparatus of a comparative example for comparison with the photographing apparatus of FIG. 7, according to an embodiment.

In the photographing apparatus of FIG. 7, when the wing unit 30 of the light adjustment unit 5 is not moved toward the first through hole 21, a sudden drop occurs in the amount of light in a peripheral portion of an image corresponding to the peripheral area of each of the lens groups 112, as shown by a graph G1. When the relative illumination is adjusted by the light adjustment unit 5 in the same condition as that of the graph G1, the light amount is reduced relatively gradually as shown by a graph G2.

After photographing is performed after the relative illumination is adjusted as shown by the graph G2, correction to increase the brightness of the whole area of an acquired image may be performed. Thus, by using the photographing apparatus configured as above, capturing of an awkward image due to a sudden drop in relative illumination as shown by the graph G1 may be prevented.

Referring to FIG. 1, the brightness correction unit 148 may correct the brightness of an image acquired by the imaging device 120. The brightness correction unit 148 may perform a function of correcting brightness of an entire area of the image acquired by the imaging device 120.

The above-described structure of the brightness correction unit 148 should not be construed as limiting. For example, the brightness correction unit 148 may correct brightness of only a peripheral area of an image acquired by the imaging device 120. When the light corresponding to the peripheral area of each of the lens groups 112 is blocked by the light adjustment unit 5, the storage unit 115 may store the positions of pixels of an image with light amounts that are reduced corresponding to the peripheral area of each of the lens groups 112. The brightness correction unit 148 may correct brightness of only the positions of pixels stored by the storage unit 115.

A comparative example of FIG. 11 shows that, after photographing is performed in a state in which a sudden drop in relative illumination occurs as shown by a graph F1, the light amount of an acquired image is forcibly corrected without using the light adjustment unit 5.

Since the light amount is drastically reduced at a peripheral portion of an image, a compensated image with a light amount that is compensated for, as shown by a graph F2, by increasing the light amount only for a peripheral portion of an image where the light amount is reduced, not increasing the light amount for the whole image. However, in the compensated image indicated by the graph F2, a change in brightness of an image becomes severe at the peripheral portion of the image so that a photographing result may not be good.

According to the photographing apparatus configured as above, when an area where relative illumination is drastically reduced is generated according to a change in relative positions of the lens groups 112, the drastic reduction in the relative illumination may be addressed as the light adjustment unit 5 moves the wing unit 30 toward the first through hole 21. Accordingly, the design limit that the diameters of the lens groups 112 are set large to overcome the drastic reduction of the relative illumination in a section where the lens groups 112 are adjusted may be efficiently overcome.

Figure 12:
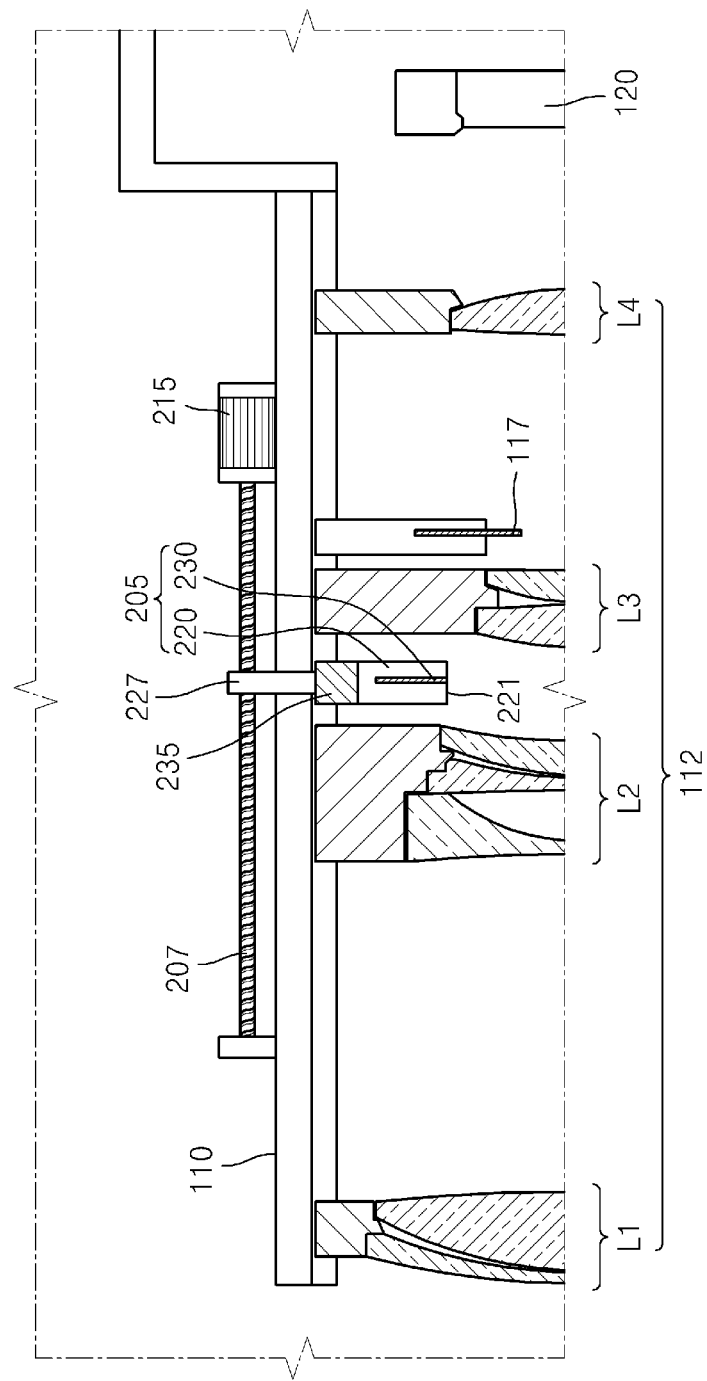
FIG. 12 is a cross-sectional view schematically illustrating some constituent elements of a photographing apparatus, according to another embodiment.
Figure 13:
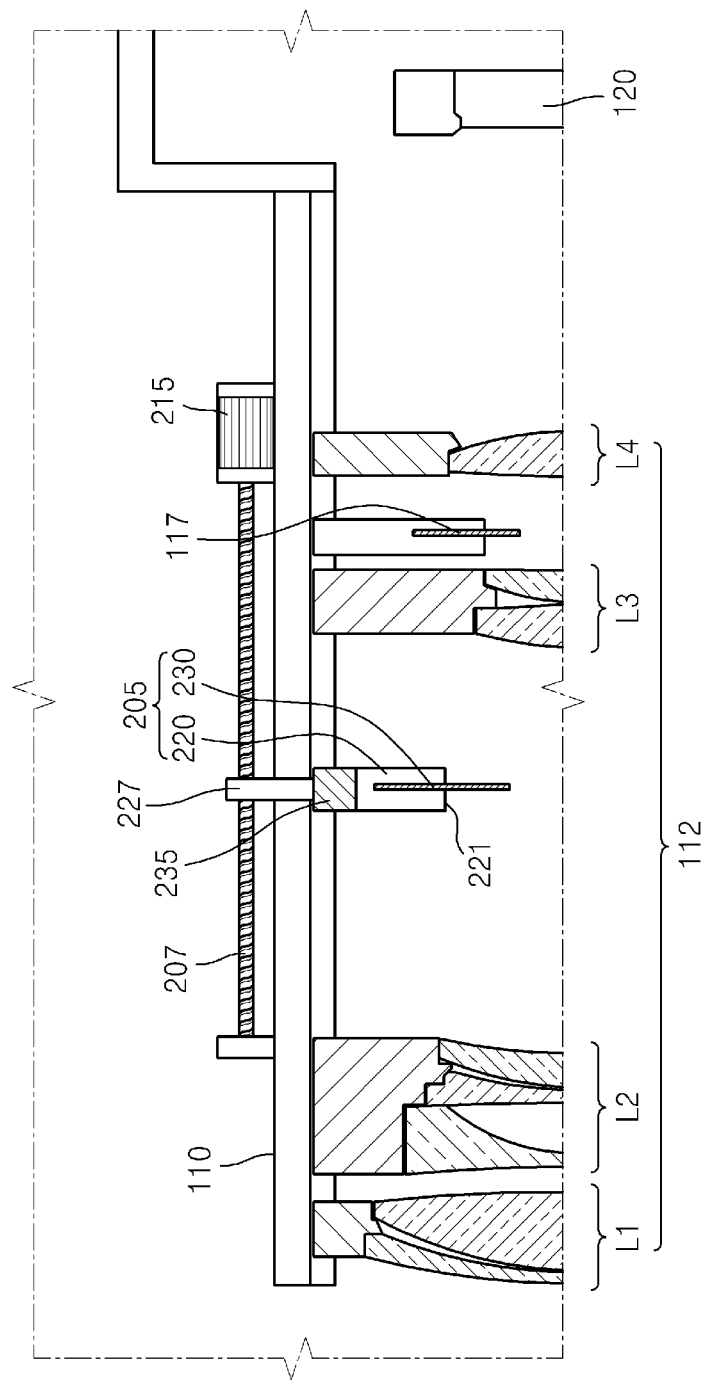
FIG. 13 is a cross-sectional view schematically illustrating an operation state of the photographing apparatus of FIG. 12, according to an embodiment.

FIG. 12 is a cross-sectional view schematically illustrating some constituent elements of a photographing apparatus, according to another embodiment. FIG. 13 is a cross-sectional view schematically illustrating an operation state of the photographing apparatus of FIG. 12, according to an embodiment.

Referring to FIGS. 12 and 13, the photographing apparatus of the present embodiment includes the barrel 110, the lens groups 112 arranged in the barrel 110 to move in the optical axis direction, the aperture 117 that adjusts an amount of light passing through the lens groups 112, a light adjustment unit 205 arranged in the barrel 110 to move in the optical axis direction and blocking light corresponding to a peripheral area of each of the lens groups 112 in at least one part of a travel section along which the plurality of lens groups 112 moves in the barrel 110, and the imaging device 120 that converts the light passing through the light adjustment unit 205 to an electric signal.

Although it is not illustrated in the drawings, the photographing apparatus according to the present embodiment includes a brightness correction unit for correcting brightness of an image acquired by the imaging device 120, as illustrated in FIG. 1.

The first lens group L1, the second lens group L2, the third lens group L3, and the fourth lens group L4 of the lens groups 112 are moved in the optical axis direction and respective intervals therebetween may be adjusted.

The imaging device 120 is arranged at a position where the light passing through the lens groups 112 arrives. Also, the aperture 117 for adjusting a light amount and a depth of field for photography is arranged near the third lens L3. The aperture 117 may be moved with the third lens group L3 in the optical axis direction.

The light adjustment unit 205 capable of moving independently of the lens groups 112 is provided in the barrel 110. The light adjustment unit 205 includes a movable unit 220 having a disc shape with a through hole 221 for passing light and arranged to move in the barrel 110 in the optical axis direction, and a wing unit 230 movably coupled to the movable unit 220 to adjust an opening area of the through hole 221.

The barrel 110 is provided with a linear guide 207, and the movable unit 220 is coupled to the linear guide 207 via a connection link 227. The movable unit 220 may perform a linear motion in a direction in which the linear guide 207 extends. The movable unit 220 may be moved along the linear guide 207 by a force generated by a first driving unit 215. The first driving unit 215 may be embodied by a step motor, an ultrasonic actuator using a piezoelectric device, a voice coil motor, etc.

A second driving unit 235 for operating the wing unit 230 is provided in the movable unit 220. The second driving unit 235 may be embodied by a step motor, an ultrasonic actuator using a piezoelectric device, a voice coil motor, etc. The first and second driving units 215 and 235 are operated by a signal applied by the control unit 140 of FIG. 1 and thus the movable unit 220 or the wing unit 230 may be moved.

According to the photographing apparatus configured as above, since the lens groups 112 are adjusted to be in a wide position, when relative illumination is drastically reduced, light passing through the peripheral area of each of the lens groups 112 may be blocked by moving the wing unit 230 toward the through hole 221. According to the operation of the light adjustment unit 205, the drastic reduction of relative illumination is prevented and thus an image in which relative illumination is gradually reduced may be obtained.

Furthermore, when an area in which relative illumination is drastically reduced according to a change in relative positions of the lens groups 112 is generated, the light adjustment unit 205 moves the wing unit 230 toward the through hole 221 and thus the drastic reduction of relative illumination may be prevented. Accordingly, the design limit that the diameters of the lens groups 112 are set large to overcome the drastic reduction of the relative illumination in a section where the lens groups 112 are adjusted may be efficiently overcome.

As described above, in a barrel assembly according to the embodiments and a photographing apparatus having the barrel assembly, since a light adjustment unit is capable of moving in the optical axis direction in a barrel and simultaneously blocking light corresponding to a peripheral area of a lens group, the drastic reduction of relative illumination may be overcome.

Since a design limit that a lens group is manufactured to have a large diameter in order to overcome the drastic reduction of relative illumination in a section where a lens group is adjusted may be efficiently overcome, a photographing apparatus and a barrel assembly may be manufactured small while maintaining superior optical performance.

Since a lens group does not need to be manufactured to have a large diameter as described above, the overall size of a lens group is decreased and thus a total distance needed for accommodation of a lens group of a barrel assembly may be reduced.

Furthermore, even when a section is generated where relative illumination is drastically reduced during the adjustment of a relative position of a lens group for a zoom function or a focal adjustment function, a light adjustment unit is accordingly designed to block light corresponding to a peripheral area of a lens group so that the drastic reduction of a relative illumination may be overcome.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A barrel assembly comprising:
   a barrel;
   at least one lens group disposed in the barrel to move in an optical axis direction;
   an aperture disposed in the barrel that adjusts an amount of light passing through the at least one lens group; and
   a light adjustment unit disposed in the barrel to move in the optical axis direction and that blocks light passing through a peripheral area of the at least one lens group when the at least one lens group is in at least one part of a travel section along which the at least one lens group moves in the barrel;
   wherein the light adjustment unit comprises:
   a movable unit having a through hole for passing light and disposed in the barrel to move in the optical axis direction; and
   a wing unit movably coupled to the movable unit to adjust an opening area of the through hole by protruding toward the through hole when the movable unit is located in the at least one part of the travel section in the barrel.

2. The barrel assembly of claim 1, wherein the wing unit is rotatably coupled to the movable unit to rotate between a closing position where the wing unit protrudes toward the through hole and an opening position where the wing unit retreats outside the through hole.

3. The barrel assembly of claim 2, wherein the light adjustment unit further comprises:
   a first cylindrical housing having a hollow shape and having a first cam groove that curvilinearly extends along a wall surface of the first cylindrical housing and a linear groove that linearly extends;
   a driving plate having a first protruding portion that outwardly protrudes and is inserted in the first cam groove, coupled to the movable unit to rotate with respect to the movable unit, and connected to the wing unit to rotate the wing unit with respect to the movable unit; and
   a second cylindrical housing disposed outside the first cylindrical housing to rotate with respect to the first cylindrical housing and having a second cam groove that curvilinearly extends,
   wherein the movable unit further comprises a second protruding unit outwardly protruding to be coupled to the second cam groove by passing through the linear groove, and the movable unit is disposed in the first cylindrical housing to move in a direction in which the first cylindrical housing extends.

4. The barrel assembly of claim 3, wherein the first cam groove comprises:
   a linear portion extending in a direction in which the first cylindrical housing extends; and
   a curved portion curved along a circumferential direction of the first cylindrical housing.

5. The barrel assembly of claim 3, wherein the wing unit comprises a slot, and the driving plate further comprises a guide protrusion that is inserted in the slot of the wing unit.

6. The barrel assembly of claim 5, wherein the movable unit further comprises an insertion slot extending in a circumferential direction of the movable unit, and the guide protrusion is inserted in the insertion slot after passing through the slot of the wing unit.

7. The barrel assembly of claim 6, wherein the driving plate further comprises an edge step portion extending a predetermined distance along an outer circumference of the driving plate, and the movable unit further comprises a support protrusion that is coupled to the edge step portion to support the driving plate.

8. The barrel assembly of claim 1, further comprising:
   a first driving unit that operates by an externally applied signal and that moves the first movable unit in the barrel in the optical axis direction; and
   a second driving unit that operates by an externally applied signal and that moves the wing unit toward the through hole.

9. The barrel assembly of claim 1, wherein the at least one lens group comprises a plurality of lenses whose intervals in the optical axis direction are adjusted, and when the intervals between the lenses are adjusted to be at a wide position, the light adjustment unit blocks the light corresponding to the peripheral area of the at least one lens group.

10. A photographing apparatus comprising:
    a barrel;
    at least one lens group disposed in the barrel to move in an optical axis direction;
    an aperture disposed in the barrel that adjusts an amount of light passing through the at least one lens group;
    a light adjustment unit disposed in the barrel to move in the optical axis direction and that blocks light passing through a peripheral area of the at least one lens group when the at least one lens group is in at least one part of a travel section along which the at least one lens group moves in the barrel;
    an imaging device that converts the light passing through the light adjustment unit to an electric signal; and
    a brightness correction unit that corrects brightness of an image acquired by an electric signal of the photographing device;
    wherein the light adjustment unit comprises:
    a movable unit having a through hole for passing light and arranged in the barrel to move in the optical axis direction; and
    a wing unit movably coupled to the movable unit to adjust an opening area of the through hole by protruding toward the through hole when the movable unit is located in the at least part of a section in the barrel.

11. The photographing apparatus of claim 10, wherein the wing unit is rotatably coupled to the movable unit to rotate between a closing position where the wing unit protrudes toward the through hole and an opening position where the wing unit retreats outside the through hole.

12. The photographing apparatus of claim 11, wherein the light adjustment unit further comprises:
    a first cylindrical housing having a hollow shape and having a first cam groove that curvilinearly extends along a wall surface of the first cylindrical housing and a linear groove that linearly extends;
    a driving plate having a first protruding portion that outwardly protrudes and is inserted in the first cam groove, coupled to the movable unit to rotate with respect to the movable unit, and connected to the wing unit to rotate the wing unit with respect to the movable unit; and
    a second cylindrical housing disposed outside the first cylindrical housing to rotate with respect to the first cylindrical housing and having a second cam groove that curvilinearly extends,
    wherein the movable unit further comprises a second protruding unit outwardly protruding to be coupled to the second cam groove by passing through the linear groove, and the movable unit is disposed in the first cylindrical housing to move in a direction in which the first cylindrical housing extends.

13. The photographing apparatus of claim 12, wherein the wing unit comprises a slot, and the driving plate further comprises a guide protrusion that is inserted in the slot of the wing unit.

14. The photographing apparatus of claim 13, wherein the movable unit further comprises an insertion slot extending in a circumferential direction of the movable unit, and the guide protrusion is inserted in the insertion slot after passing through the slot of the wing unit.

15. The photographing apparatus of claim 14, wherein the driving plate further comprises an edge step portion extending a predetermined distance along an outer circumference of the driving plate, and the movable unit further comprises a support protrusion that is coupled to the edge step portion to support the driving plate.

16. The photographing apparatus of claim 10, further comprising:
    a first driving unit that operates by an externally applied signal and that moves the first movable unit in the barrel in the optical axis direction; and
    a second driving unit that operates by an externally applied signal and that moves the wing unit toward the through hole.

17. The photographing apparatus of claim 10, wherein the brightness correction unit corrects brightness only for the peripheral area of an image acquired by the imaging device.

18. The photographing apparatus of claim 17, further comprising a storage unit that stores positions of pixels of an image with light amounts that are reduced corresponding to the peripheral area of the at least one lens group when the light adjustment unit blocks light passing through the peripheral area of the at least one lens group, and the brightness correction unit corrects brightness of the positions of pixels stored by the storage unit.

* * * * *